Nov. 28, 1961     E. FOLEY     3,010,479
TIME MODULATED FLUID CONTROL VALVE
Filed Dec. 28, 1956     2 Sheets-Sheet 1
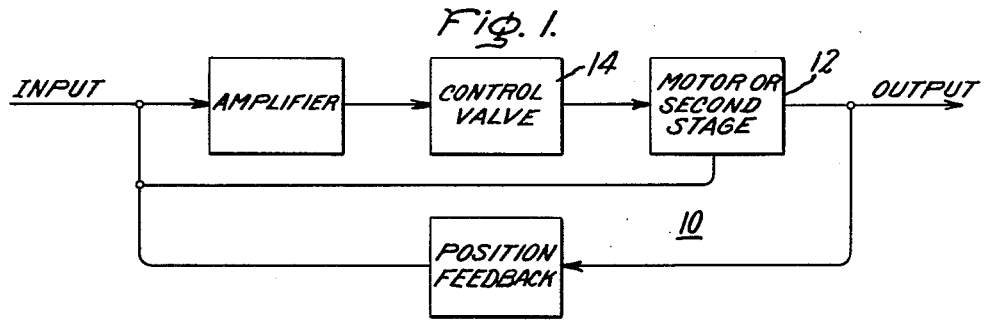
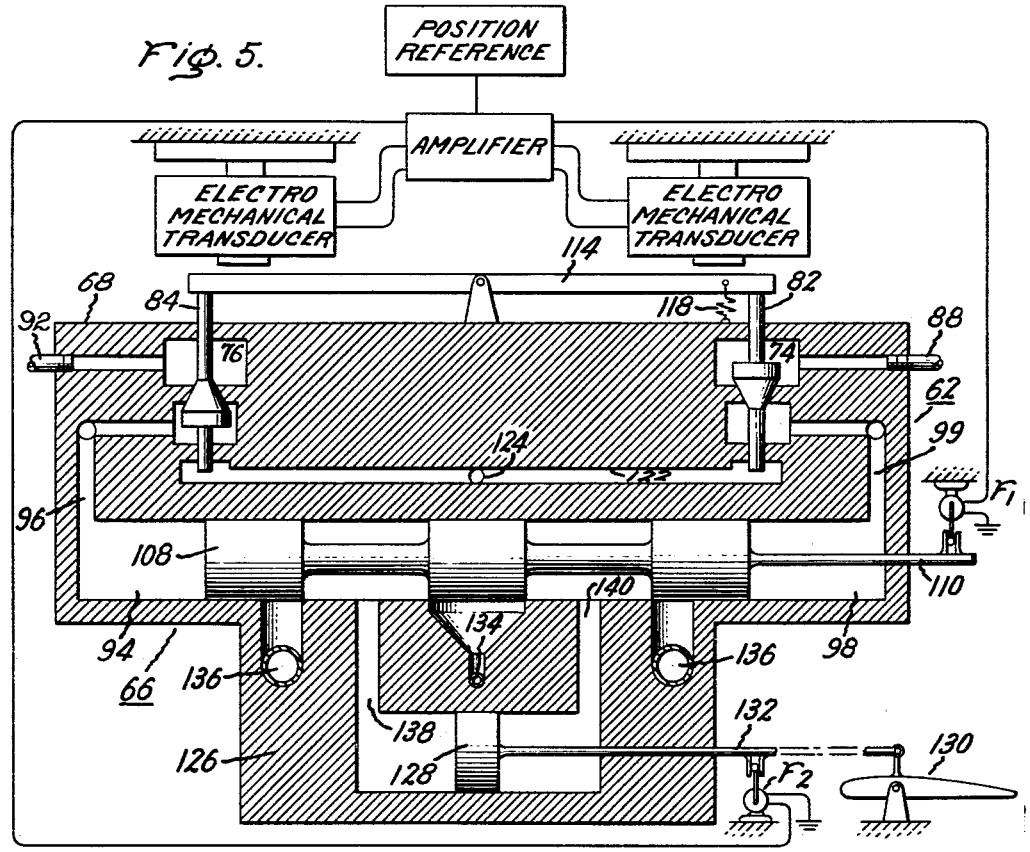
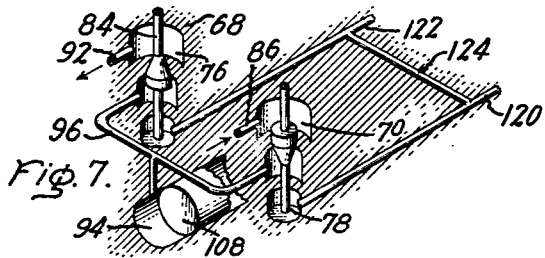
Inventor:
Edward Foley,
by Roe D. McBurnett
His Attorney.

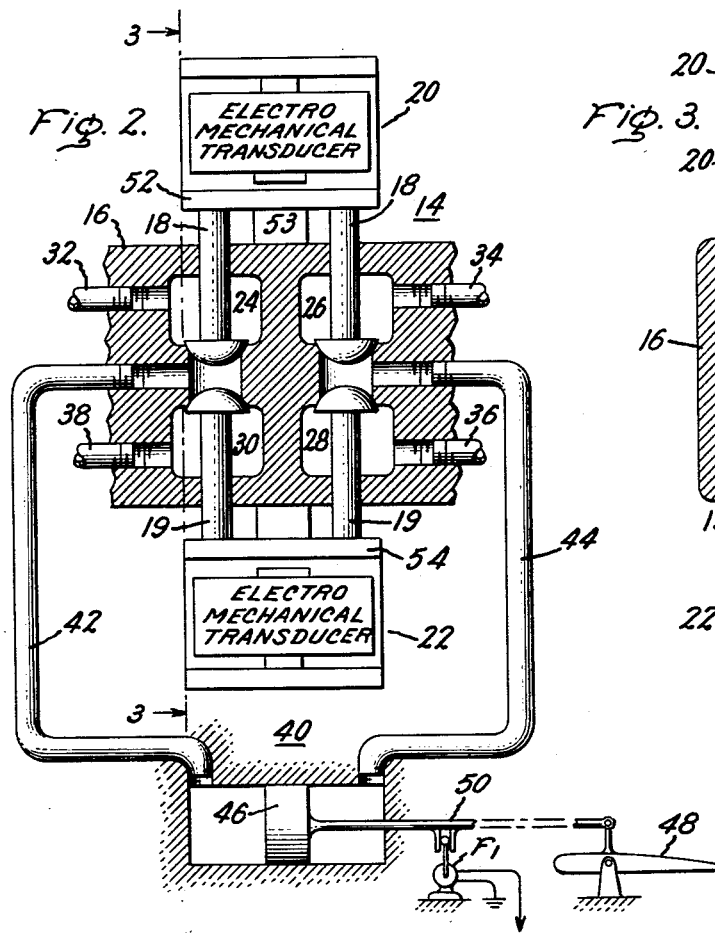

United States Patent Office 3,010,479
Patented Nov. 28, 1961

3,010,479
TIME MODULATED FLUID CONTROL VALVE
Edward Foley, Schenectady, N.Y., assignor to General
Electric Company, a corporation of New York
Filed Dec. 28, 1956, Ser. No. 631,316
4 Claims. (Cl. 137—622)

The present invention relates to a fluid control valve and more particularly to a valve for modulating the flow or pressure of a fluid by controlling the length of time that the valve is opened.

The present type of control valves generally make use of fluid flow or pressure modulation resulting from small mechanical motions between a movable valve element and a fluid port. The configuration of these fluid control valves are such that any displacement of the control element or movable member results in a flow area change. Due to the valve actuator or input transducer limitation, a high response control valve has small maximum force and displacement capabilities, so that the net result is the requirement of proportional changes of a small area.

Hence, in presently used valves this resultant proportional control of a small area sets up undesirable conditions for valve silting and stiction as well as gain variations due to signal level and temperature. Stiction is a term used in the servo art which means static friction. Valve silting refers to a valve condition wherein foreign matter, existing in the fluid, is accumulated between cooperating movable valve members to increase the stiction or static friction in the valve, and to decrease the flow area over an extended period of operation. Present attempts to circumvent valve silting and stiction by employing an open-center valve system suffer from increased power loss and do not eliminate gain variations occurring with temperature and signal level changes.

The present invention utilizes a number of poppet type valves and electromechanical transducers associated therewith so that the valve actuator is an on-off type of electromechanical transducer. The signal level to this transducer is of a magnitude to operate the transducer into its saturation range. Saturation of the valve transducer indicates that an increase in ampere-turns does not greatly affect the flux density of the magnetic structure. Of course, the air gap existing in the transducer materially affects the ampere-turns at which saturation begins. Saturation of the control valve means that the valve is at maximum opening and hence has a maximum flow for any given condition of supply pressure and load. The control valves are structurally very small to keep the weight and size down to a minimum, and keep the input power, pressure and flow forces, any existing frictional forces, any leakage, and the inertia as low as possible. In this manner, the present invention overcomes leakage power loss inherent in conventional variable area control valves, which loss varies with pressure in a substantially direct relationship. In a fluid control valve, constructed in accordance with the principles of the present invention, the structural relationships of a valve can be controlled so as to substantially eliminate leakage loss in the system.

Further, for flow in one direction, one of the transducers of the present invention is energized so that the poppet or control valves attached to the transducer armature, or operatively coupled thereto, move to a maximum opening. In the meantime, the second transducer is dormant, and flow occurs at maximum rate in a direction determined by the predetermined selection of the energized transducer. The signal provided to the transducers may be in any of a number of ways, such as by supplying a number of definite pulses per unit time, or by varying the time length of the pulse. In this manner, the total flow through the valve structure is proportional to the time of valve opening and not to the amount of valve opening. Accordingly, the present control valve may be used in conjunction with an integrating device or second stage valve structure such as a linear or rotating motor, as hereinafter disclosed.

In brief, the present invention circumvents the problems found in the conventional or presently utilized control valves by greatly reducing or eliminating conditions, such as valve silting and stiction, which cause them. This is accomplished by operating the valve as a discontinuous element so that both valve and valve actuator are operated in saturation and the time of opening is modulated instead of the amount of opening. The present invention has the advantages of eliminating valve silting and stiction, requires no null leakage, reduces the effect of temperature on the over-all valve gain, presents full line supply pressure available to overcome load stiction, and allows for greater flexibility of signal inputs.

An object of the present invention is the provision of a fluid control valve and an operatively associated valve actuator both driven into saturation.

Another object is to provide a fluid control valve utilizing time modulation instead of area modulation to control fluid pressure or flow.

A further object of the invention is the provision of a fluid control valve operating as a discontinuous element instead of a continuous element wherein the time of opening is modulated instead of the amount of opening.

Other objects and many of the attendant advantages of this invention will be readily appreciated as the same becomes better understood by reference to the following detailed description when considered in connecting with the accompanying drawings in which like reference numerals designate like parts throughout the figures thereof and wherein:

FIGURE 1 is a block diagram showing the utilization of the present invention in a closed servo system;

FIGURE 2 is a plan view, partly in section, of a preferred embodiment of the invention, greatly exaggerated for purposes of illustration, showing a number of poppet type valves associated with electromechanical transducers;

FIGURE 3 is a side view of a section of the device taken on the line 3—3 of FIGURE 2, looking in the direction of the arrows and more clearly showing the construction of the electromechanical transducers.

FIGURE 4 is a top view of another embodiment of the present invention, showing the parallel arrangement of the poppet valves and the transducers associated therewith;

FIGURE 5 is a side view, partly in section, of the device taken on the line 5—5 of FIGURE 4, showing the utilization of a fluid control valve as the first stage of a two-stage valve;

FIGURE 6 is a side view, partly in section, of the device of FIGURE 5, illustrating the structural and functional relationship of one pair of poppet valves; and FIGURE 7 is an exploded view in perspective of the conduits associated with the two-stage valve and showing the structure in the region around the line 7—7 of FIGURE 4.

Referring now to the drawings, there is illustrated in FIGURE 1 a block diagram of a closed servo loop 10, such as used to position the control surface of an aircraft. The control surface would be operatively coupled to a power control actuator, indicated as the motor or second stage 12, in response to manual input signals, such as through a control stick or in response to automatic flight control signals provided by an autopilot and a damper reference, hereinafter referred to as the position reference. The position reference provides the input to an amplifier which energizes a control valve 14 which, in turn, controls the flow of fluid to the second stage actuator 12 providing a predetermined output to the control surface, or such similar device. A position feedback signal is provided from the second stage to the amplifier for stabilization of the inner servo loop, while a feedback or position feedback signal is transmitted from the output to the amplifier to predeterminedly cancel out the input reference signal to rebalance the servo loop.

FIGURE 2 illustrates a preferred embodiment 14 of the present invention which comprises a housing 16 containing the fluid control valves 18, herein shown for purposes of illustration as poppet type valves, slideably cooperative within said housing, as hereinafter described. The fluid control valves comprise a pair of axially cooperating poppet type valves 18, or the like, slideable within said housing 16 to act in unison relative to the oppositely seated poppet valves 19, in response to their respectively coacting electromechanical transducers 20 and 22.

The housing 16 is formed with a number of pairs of adjacent and unconnected chambers, wherein a first pair 24 and 26 and a second pair 28 and 30 operatively cooperate with poppet valves 18 and 19, respectively. Fluid chamber 24 is connected to a high pressure fluid source through a conduit 32, while operatively associated chamber 26 is connected to a fluid drain by a conduit 34. In the second pair, chamber 28 is connected to the high pressure source through a conduit 36 and chamber 30 to the fluid drain through a conduit 38.

The first and second pairs of fluid chambers are hydraulically coupled to a power actuator 40 by conduits 42 and 44 so that selective actuation of the poppet valves will control the flow of fluid to the actuator 40 to predeterminedly actuate a power piston 46 slideable therein. The power piston is conventionally coupled to a control surface 48 through a suitable linkage 50, to be actuated in response to the position reference signal. A feedback $F_1$ is operatively associated with the linkage 50 to feed an output signal to the amplifier to cancel the position reference input when the control surface 48 is stabilized in its predetermined position.

The electromechanical transducers 20 and 22 are provided with resilient armatures 52 and 54, and are mounted on the housing 16 through mounting blocks 53. Resilient armatures 52, 54 are coupled by suitable securing means, such as brazing, or the like, to the poppet valves 18 and 19, respectively. Due to the utilization of a magnetically operated mechanism, the poppet valves 18 and 19 are constructed from a suitable non-magnetic material, as is the housing 16 and the mounting blocks 53 to maintain a uniform magnetic circuit. The electromechanical transducers are electrically coupled to the amplifier, and, in turn, to the position reference input to be selectively energized thereby. The poppet valves 18 and 19 are selectively slideable within the housing 16 in response to the magnetic field produced by the energized electromechanical transducer to control the flow of fluid through conduits 42 and 44 to the actuator 40.

In the operation of the preferred embodiment of FIGURE 2, the control valves 18 and 19 are actuated by the on-off type of electromechanical transducer energized through the amplifier responsive to the position reference input. The signal level to these transducers is of a magnitude to operate them into their saturation range so that an increase in ampere-turns does not greatly affect the flux density of the magnetic circuit. Also, the air gaps in the electromechanical transducers are of a predetermined amount since the gap materially affects the ampere-turns at which saturation begins. Thus, saturation of the control valve will indicate that the valve is at maximum opening and hence has a maximum flow for any given condition of supply pressure and load existing in the system.

The poppet valves 18 are very small, exaggerated in the drawings for purposes of illustration, to keep the weight and size at a minimum so that the input power and the pressure and flow forces are low to achieve low frictional forces, minimum leakage, and minimum inertia. In this manner, the leakage power loss which varies with pressure and is so common with conventional control valves, can be substantially eliminated in a control valve constructed in accordance with the principles of the present invention.

In brief, for flow in one direction or movement of the power piston 46 in one direction, the corresponding transducer is energized so that the flow will be in a proper direction to actuate the power piston as desired. When the selected transducer is energized, the poppet valves operatively coupled to the related armature move to a maximum opening. Since the second transducer is dormant and the poppet valves coupled thereto closed, flow occurs at maximum rates in a direction determined by the particular transducer energized.

Hence, in the operation of the preferred embodiment 14, the total flow to the power actuator 40 is proportional to the time of valve opening which determines the direction of flow through the chambers 24, 26, 28 and 30, and through the conduits 42 and 44. In this manner, predetermined selection of the transducer to be energized, and duration of energization, will determine the direction of the power piston 46 and of the control surface 40.

In the embodiment of the invention illustrated in FIGURES 4 through 7, a fluid control valve, constructed in accordance with the principles of the present invention, is used as a first stage 62 of a two-stage valve wherein the second stage is a conventional spool type control valve 66. In this manner, by utilizing a control valve with minimum weight and size, good power gain and load isolation is obtained with a low inertia first stage.

The two-stage valve is incorporated within a housing 68 formed with a number of fluid chambers 70, 72, 74 and 76, having a number of poppet type valves 78, 80, 82 and 84, respectively, associated therewith, to control the flow of fluid therethrough. The chambers 70 and 74 are coupled to a conventional high pressure supply through conduits 86 and 88, respectively, while the chambers 72 and 76 are connected to a fluid drain through conduits 90 and 92, respectively. The fluid chambers 70 and 76, as seen in FIGURE 7, are hydraulically coupled to one end 94 of the second stage spool type control valve through a common conduit 96, while chambers 72 and 74 are similarly coupled to the other end 98 through a common conduit 99 so as to selectively control the flow of fluid to the valve 66 in response to the position reference input signal.

The second stage spool type control valve 66 comprises a slideable valve piston 108 having a plurality of integral lands and a shaft extension 110 extending through the end 98 of said housing 68. A follow-up mechanism $F_1$ is mechanically coupled to the shaft extension 110 to transmit a position feedback to the amplifier to stabilize the closed loop servo system.

The poppet valves 78, 80 and 82, 84, constructed from non-magnetic materials, as is the housing 68 and the components associated therewith, are operatively coupled to levers 112 and 114, respectively, pivotally mounted upon the housing 68. Levers 112 and 114 are biased by springs 116 and 118, respectively, so as to maintain the valves in a closed position when the transducers are not energized. The pivoted bar 112 is pivotally actuated in response to the magnetic circuits of the electromagnetic transducers suitably energized through the amplifier in response to the position reference input. Fluid passageways 120 and 122 are provided between chambers 70 and 72 and between 74 and 76, respectively, with an interconnecting duct 124 which functions to stabilize the hydraulic circuitry between the two coacting pairs of poppet valves.

The second stage spool type control valve 66 is hydraulically coupled to a power actuator 126 provided with a power piston 128 actuated in response to the actuation of the first stage fluid control valve 62. The power piston 128 is coupled to a control surface 130 through suitable linkage 132, partially shown in FIGURE 5 and operatively associated with a feedback device $F_2$ which transmits a feedback signal to the amplifier to cancel the position reference signal whenever the control surface 130 has reached its predetermined position. The second stage 66 is operatively hydraulically connected to a high pressure fluid source 134 and to suitable drains 136, and hydraulically coupled to the power actuator 126 through conduits 138 and 140.

In the operation of the embodiment of FIGURES 4 through 7, wherein good power gain and load isolation is obtained with a low inertia first stage 62, for each case of operation, the direction of required flow to the power actuator 126, is sensed by the error signal from $F_2$. The amplifier, in turn, discerns the sense of the signal received and sends its output to energize the proper transducer. As in the previous embodiment, both the poppet valves 78 through 84 and the associated transducers are operated in saturation and the time of valve opening is modulated instead of the amount of opening.

For example, if the signal transmitted by the amplifier energizes the transducer operatively associated with the lever 112, valves 78 and 80 will open and high pressure fluid will enter through the conduits 86 and 96 to the end 94 of the second stage valve 66. Hence, the valve piston 108 will move to the right, in FIGURE 5, to drain fluid from the end 98 through conduits 99 and 90. Movement of the valve will cause high pressure fluid to enter from source 134 through conduit 138 to the power actuator 126 to displace the power piston to the right. Thus, the control surface 130 will be selectively actuated until the feedback $F_2$ transmits its position signal to the amplifier to null the input signal when the predetermined degree of surface movement has been attained.

For reverse movements of the control surface 130, the operation will be the reverse of those stated above. Hence, poppet valves 82 and 84 will be actuated by their coacting energized transducer and the flow controlled by the modulation of the time of the opening of the valves. Springs 116 and 118 will restore and maintain their respective valves in a null position when not actuated for controlling the fluid flow to the power piston 128. As seen from FIGURE 6, the springs serve to bias their respective lever and poppet valves to a null position.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. Control valve means for modulating flow of a fluid comprising a number of pairs of normally closed valve means, each pair including an inlet and an outlet valve, a valve actuator operatively connected with each pair of said valve means to open said inlet and outlet valves, selector means for selectively energizing each of said actuators as an on-off device, and each of said actuators upon energization selectively actuating one pair of said valve means to modulate the flow of fluid as a function of time.

2. Control valve means adapted to eliminate silting and stiction comprising a plurality of pairs of poppet valves, each pair including an inlet and an outlet valve, pivot bars, one coupled to each pair of poppet valves, a plurality of electromechanical transducer means, one of said transducer means being selectively operatively coupled to each of said pivot bars, position signal means energizing said transducer means for selectively actuating one of said pivot bars for operating one of said pairs of poppet valves.

3. The control valve means of claim 1 further comprising a second stage pool type control valve including a slidable valve piston, and means connecting the opposite sides of said piston across each of said pairs of valve means in such a manner that said piston is reversibly positioned in accordance with said modulation of liquid flow.

4. The control valve means of claim 1 further comprising means responsive to said fluid flow for producing a feedback signal in accordance with a function of the integral of fluid flow, and servo means operatively connected to said energizing means and responsive to said feedback signal and an input control signal for controlling said actuators.

References Cited in the file of this patent

UNITED STATES PATENTS

| | | |
|---|---|---|
| 2,300,112 | Ellinwood | Oct. 27, 1942 |
| 2,617,444 | Gardner | Nov. 11, 1952 |
| 2,637,341 | Borst | May 5, 1953 |
| 2,685,342 | Lauck | Aug. 3, 1954 |
| 2,690,767 | Sage | Oct. 5, 1954 |
| 2,700,374 | Jacobsen | Jan. 25, 1955 |
| 2,741,460 | Gardner | Apr. 10, 1956 |
| 2,800,913 | Swartwout | July 30, 1957 |
| 2,821,997 | Clay et al. | Feb. 4, 1958 |

FOREIGN PATENTS

| | | |
|---|---|---|
| 345,061 | Great Britain | Mar. 19, 1931 |